United States Patent [19]

Labrum et al.

[11] Patent Number: 4,648,135

[45] Date of Patent: Mar. 3, 1987

[54] PHOTO DIODE-ARRAY DYNAMIC RANGE FOR OPTICAL SIGNAL SYSTEMS

[75] Inventors: Joseph H. Labrum, West Jordan; Allen D. Wilcox, Bountiful, both of Utah

[73] Assignee: Sperry Corporation, Blue Bell, Pa.

[21] Appl. No.: 632,635

[22] Filed: Jul. 20, 1984

[51] Int. Cl.$^4$ .......................... H04B 9/00; H01J 40/14
[52] U.S. Cl. .................. 455/619; 250/214 R; 250/214 L
[58] Field of Search ............... 455/619, 612, 606, 607, 455/617; 250/214 A, 214 C, 214 L, 214 P, 214 R; 358/212, 213

[56] References Cited

U.S. PATENT DOCUMENTS

| | | | |
|---|---|---|---|
| 3,600,589 | 8/1971 | Hanson | 250/214 L |
| 4,499,610 | 2/1985 | Miltonberger | 455/619 |
| 4,521,920 | 6/1985 | Forsberg et al. | 455/619 |
| 4,551,623 | 11/1985 | Elliott et al. | 250/214 R |

Primary Examiner—Joseph A. Orsino, Jr.
Attorney, Agent, or Firm—G. Donald Weber, Jr.; Glenn W. Bowen

[57] ABSTRACT

A signal handling system of improved dynamic range wherein a logarithmic circuit is interposed between a photo-diode array and other output circuitry.

12 Claims, 3 Drawing Figures

PHOTO DIODE-ARRAY DYNAMIC RANGE FOR OPTICAL SIGNAL SYSTEMS

BACKGROUND

1. Field of the Invention

This invention is directed to optical signal processing systems, in general, and to the photo-diode array which is used as the output section, in particular. More particularly, an improved photo-diode array with expanded dynamic range is provided.

2. Prior Art

There are many types of optical signal processing systems known in the art. One such system is described in copending application entitled ACOUSTO-OPTIC R-F FILTER WHICH IS TUNABLE AND HAS ADJUSTABLE BANDWIDTH, by J. H. LABRUM, bearing U.S. application Ser. No. 566,437, filed on Dec. 28, 1983, and assigned to the common assignee. This particular copending application is not intended to be an exhaustive study of optical signal processing systems but is one illustrative representation thereof.

In the known systems of this type, one of the limiting factors on the operational characteristics thereof is the output portion of the system. In the known prior art, the output section usually includes a photo-diode array which is used to detect the optical signal produced by the remainder of the system and to supply representative electrical signals to output signal controlling and/or processing circuitry.

In the past, it has generally been desirable to have a dynamic range which is as wide as possible. The goal has, typically, been to permit operation on the order of a 60 dB dynamic range. However, in the past the typical operational range which has been achievable has been on the order of 30 dB instantaneous dynamic range. Often times, the limiting factor in this operation has been the dynamic range of the output electronics which has the 30 dB characteristic. That is, the photo-diode array has frequently been limited to a dynamic range on the order of approximately 30 to 40 dB. However, the satisfactory operational characteristics of the photo-diode array have not been able to be utilized because of the output circuitry limitations. Consequently, an improved output system is highly desirable.

SUMMARY OF THE INVENTION

This invention is directed to an improved output system for an optical data or signal processing system. In particular, a photo-diode array is provided as a part of the data processing system. Improved operation of the photo-diode array is permitted by the utilization of a logarithmic function circuit which is interposed between the photo-diode array and the electronics to be driven thereby. The logarithmic function circuit has the effect of compressing the signal level supplied by the photo-diode array thereby enlarging the effective dynamic range of the circuit.

DESCRIPTION OF PREFERRED EMBODIMENTS

Figure 1:
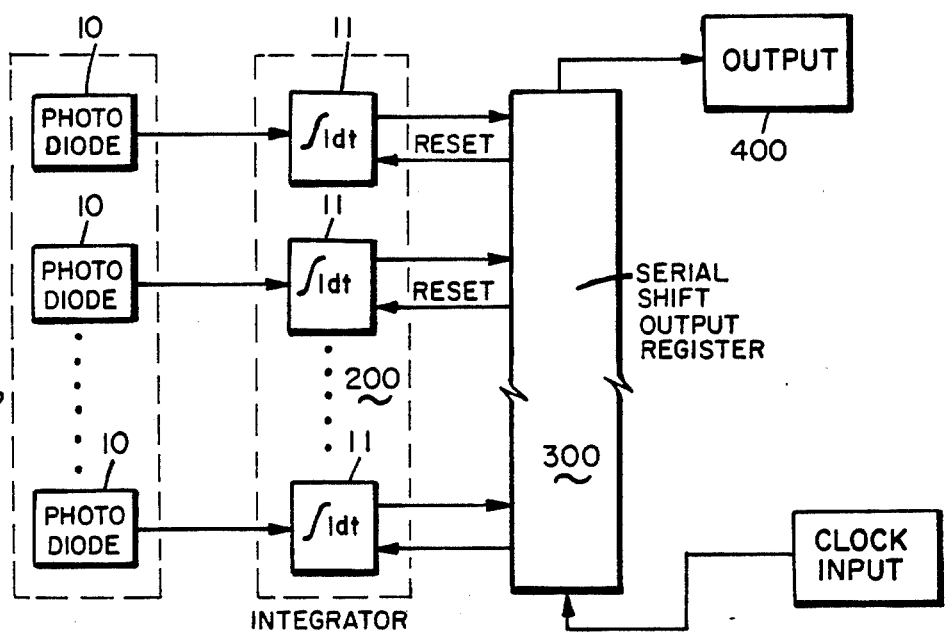
FIG. 1 is a schematic diagram of a photo-diode output array known in the prior art.

Referring now to FIG. 1, there is shown a circuit which is known in the prior art. This circuit is a typical output circuit of an optical signal processing circuit. The system uses a plurality of photo-diodes 10 which are arranged to form a photo-diode array 100. In typical applications, the photo-diode array 100 may comprise a thousand or more individual photo-diodes 10. Typically, the photo-diodes have a dynamic range of signal operation of up to 50 dB.

Each of the photo-diodes is connected to an integrator circuit 11 in the integrator function 200. The output of each integrator circuit 11 is connected to an input terminal of a serial shift, output register 300. A reset terminal is also connected from the register 300 back to the reset terminal of the individual integrator circuits 11. A suitable clock input signal is supplied to register 300 to cause the shifting thereof while an output device 400 which can comprise other circuitry or the like is connected to receive the signals which are shifted out of the shift register 300. The photo-diode array 100, integrating circuitry 200, register 300 and output circuitry 400 can all be integrated in one device, if so desired.

This circuit arrangement is known in the art. However, the dynamic range of this circuit is severely limited by the integrator function 200 and the operation of each of the integrator circuits 11. That is, if the integrator function circuit is not sampled and reset sufficiently frequently, the individual integrator ciruits 11 will saturate at or near the power supply voltage signal of the electronic circuitry included within the serial shift output register 300 or the output circuitry 400.

On the other hand, if the integrator circuit 11 is designed so that the integration function and, thus, the integration constant is sufficiently long so as to accept the largest expected signal from the photo-diode during any clock input period, the low end dynamic range will be an exceedingly small input signal. Thus, there will be produced an output signal which will include excessive error and noise at the lower end. That is, the input clock period will, of course, be the same for a small signal as well as a large signal because the system is a single array.

On the other hand, if the clock period is adjusted to respond to the smaller signal, the integrator will quickly saturate for the larger signals as noted above, and an improper signal will be produced. Along the same lines, because the integrator circuits 11 can tend to saturate, a poor signal-to-noise ratio is achieved. As a result of these difficulties, the dynamic range of this type of system is usually restricted to about 30 dB.

Figure 2:
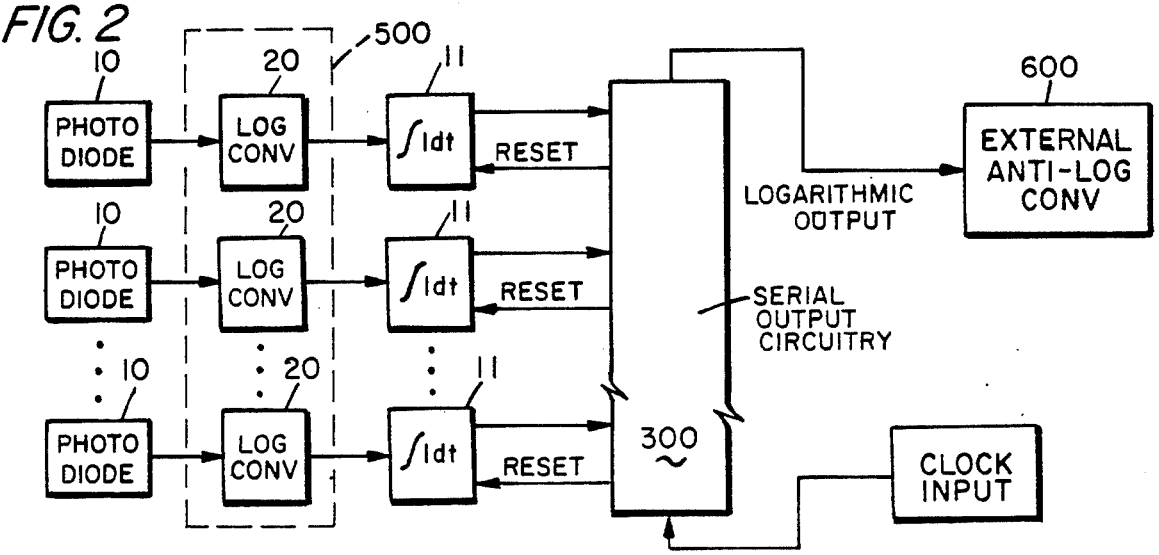
FIG. 2 is a schematic diagram of a photo-diode output array using a logarithmic function circuit in accordance with the instant invention.

Referring now to FIG. 2, there is shown an improved output circuit of the instant invention. In this case, each photo-diode 10 in the photo-diode array 100 is connected to a logarithmic function circuit 20 in the overall log function unit 500. Each of the log function circuits 20 is connected to a respective integrator circuit 11. Each of the integrator circuits 11 is connected to the serial output circuit 300 as was the case in the embodiment shown in FIG. 1. Again, the clock input source is connected to supply clock signals to the shift register 300. However, in this case the output signal from register 300 may be connected to an external anti-log circuit 600 in order to convert the signal, if so desired.

In operation, this circuit provides improved operation especially in terms of dynamic range of operating characteristics. That is, the output signal from the photo-diode 10 is a current and, thus, is not dynamic limited until it is integrated. By supplying this current to a logarithmic converter circuit 20, the dynamic range of the photo-diode is maintained. That is, the logarithmic converter will operate upon the current signals from the photo-diode to compress the signal level thereof. More particularly, the small signals from the photo-diode are made larger and the large signals from the photo-diode are reduced in size, as is the natural consequence of a logarithmic converter. However, the intelligence of the signal is maintained inasmuch as the output is ultimately retrieved by passing the signal through the external anti-log converter 600 which reconstructs the original signal.

In an alternative embodiment, the output signal from the shift register 300 could simply be displayed on a logarithmic scale (not shown) and the external anti-log circuit 600 can be eliminated.

In the system shown in FIG. 2, the signal which has been compressed by the log converter 20 is then, typically, supplied to the integrator circuits 11 as before wherein the signals are integrated and supplied to the shift register 300 in accordance with the clock input signal. However, as noted, the log converting circuit 20 has compressed the signals so that for the constant clock period, the smaller signals have a larger effect and the larger signals have a lesser effect in the same time context.

The type of log converting circuit 20 is not a crucial portion of this invention, per se. It is contemplated that log conversion circuits using a forward biased diode junction can be provided. This diode junction can be a combination of a transistor (or other semiconductor) and a diode or merely the emitter collecter diode in a PNP transistor, each of which arrangements provides a logarithmic function to the input signal.

It has been determined that this type of logarithmic circuit can provide a 60 to 80 dB dynamic range which would be easily able to operate upon the signal produced by the photo-diode array 100.

More importantly while a logarithmic conversion circuit or logarithmic function circuit is denoted, other signal compression techniques can be utilized. However, it is believed that the logarithmic function is one of the easiest types of signal compression to implement.

Figure 3:
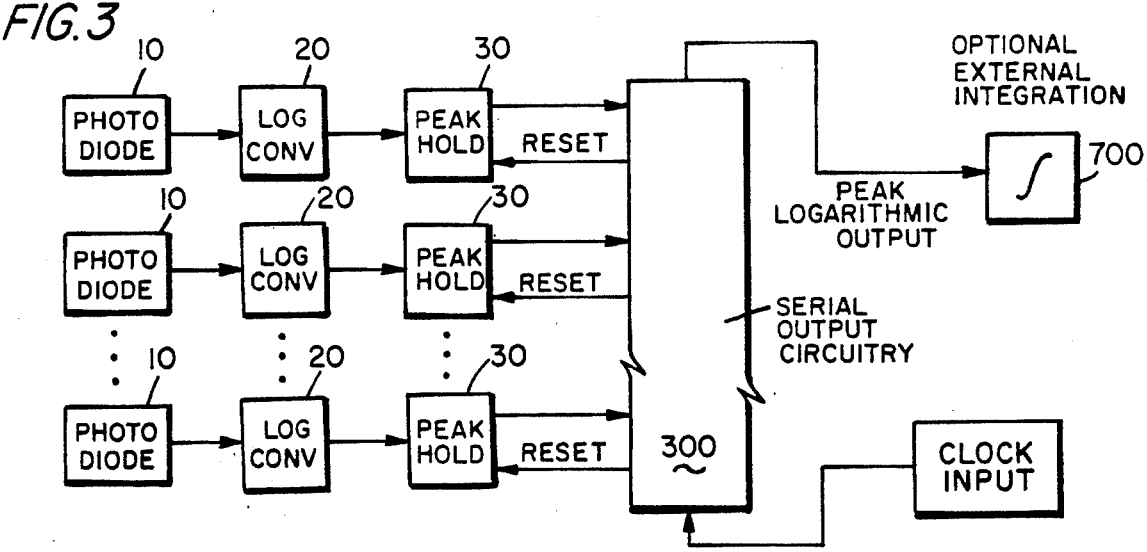
FIG. 3 is a further embodiment of the instant invention wherein the integrating circuit has been replaced by a peak hold circuit.

Referring now to FIG. 3, there is shown another embodiment of the instant invention. In the embodiment shown in FIG. 3, the photo-diodes 10 are connected to log conversion circuits 20 which are then connected to peak hold circuits 30 which are connected to the serial register 300. The clock input signal is also provided as before. As shown in FIG. 3, an optional external output integrator 700 can also be included at the output of the shift register 300.

The operation of the circuit shown in FIG. 3 is similar to the operation of the circuits previously described. However, the peak hold circuit 30 has the ability to detect and hold the peak signal which has been supplied thereto. That is, the maximum or peak signal supplied to the circuit 30 is detected and retained by the shift register 300. This preserves the peak signal value rather than the integrator circuit signal. This situation is useful inasmuch as the integrator circuit tends to operate as a signal averager over-extended time periods.

The system shown in FIG. 3 is especially useful in the situation where the signals supplied to or by the photo-diodes 10 are extraordinarily short time duration signals (such as frequency hopped spread frequency spread signals, i.e. "frequency hoppers") which often occur and disappear more rapidly than the clock input rate can detect. That is, the photo-diode channels are each detected or sampled in accordance with the clock input signal rate. When an integrator is used as shown in FIGS. 1 and 2, the channel integrator continues to integrate the signal supplied thereto until it is sampled and reset by the shift register. In this arrangement, a high frequency signal could be lost in the integrated circuit inasmuch as a great deal of noise and other background signals would also be being integrated, as well. Thus, fast "frequency hop" signals would be missed.

By using the circuit shown in FIG. 3, the signals supplied from the log converter 20 (and the photo-diode array 100) can be continuously monitored so that a frequency input spectrum can be detected. The fast "frequency hop" signal value can be detected and held in the peak hold circuit 30 until this circuit 30 can be sampled by the serial output shift register circuit 300. This operation will eliminate the "integrating out" of short duration signals.

In an optional circuit arrangement, the output of register 300 can be connected to an external integration function circuit 700. The circuit 700 will integrate the signals provided by the shift register 300 so that the advantages of integration on continuous, non-moving signals can be used as an external function or a switchable option.

Thus, there is shown and described an improved output circuit for an optical signal processing system. This circuit extends the operation of existing photo-diode dynamic range operation. The system is relatively simple to implement but provides greatly improved operating characteristics.

While the description suggests certain types of logarithmic conversions or functions, it is clear that other signal compression techniques can be used as noted. The description above is intended to be illustrative only and is not intended to be limitative. Any modifications of this circuit which fall within the purview of the description thereof are intended to be included herein as well. The description is not intended to limit the scope of the invention. Rather, reference is made to the claims appended hereto.

We claim:

1. An optical signal processing system with improved dynamic range comprising,
   an optically sensitive signal source,
   a logarithmic converter circuit connected to receive and compress signals from said signal source,
   peak hold circuit means connected to receive compressed signals from said logarithmic converter circuit,
   output circuitry including shift register means which selectively receives signals from said peak hold circuit in response to a control signal, and
   integrator means connected to the output of said shift register means.

2. The system recited in claim 1 wherein,
   said optically sensitive signal source comprises photo-diode means.

3. The system recited in claim 1 including, anti-logarithmic conversion means connected to the output of said shift register means.

4. The system recited in claim 1 wherein, said shift register means comprises a serial shift circuit.

5. The system recited in claim 1 wherein, said peak hold circuit means is connected to supply signals to said shift register means and to receive reset signals therefrom.

6. The system recited in claim 1 including, clock signal means for supplying clock signals to said shift register means to control the shifting operations thereof.

7. The system recited in claim 1 wherein, said peak hold circuit means consists of integrator circuit means.

8. The system recited in claim 7 wherein, said integrator circuit means is connected to supply signals to said shift register means and to receive reset signals therefrom.

9. An optical signal processing system comprising, photo-diode means for receiving light signals of varying amplitude and producing electrical signals representative of said light signals, signal compression means connected to receive said electrical signals from said photo-diode means and produce compressed signals with reduced amplitude range relative to said electrical signals, peak detection and hold means connected to said signal compression means to store the peak value signal of said compressed signals, output register means connected to selectively receive said peak value signal from said peak detection and hold means, and control means for selectively enabling said output register means to selectively receive and store said peak value signal and selectively resetting said peak detection and hold means.

10. The system recited in claim 9 wherein, said output register means includes a plurality of stages which are separately enabled by said control means.

11. The system recited in claim 9 wherein, said control means comprises a source of clock pulses which have a longer duration than at least some of the light signals received at said photo-diode means.

12. An optical signal processing system comprising, a plurality of photo-diodes for receiving a plurality of different frequency light signals which light signals exhibit varying amplitude and producing electrical signals representative of said light signals, a plurality of signal compression means connected to receive said electrical signals from said plurality of photo-diodes and produce compressed signals with reduced range relative to said electrical signals, a plurality of peak hold means connected to said plurality of signal compression means to store the peak value signal of said compressed signals, output register means comprising a plurality of stages each of which is connected to selectively receive said peak value signal from said plurality of peak hold means, and control means for supplying a clock signal for selectively enabling the stages of said output register means to selectively receive and store said peak value signal and selectively resetting said peak hold means.

* * * * *